Nov. 16, 1965     L. G. VOISINE     3,217,746

FLUID VALVE COUPLING WITH INTERLOCKING LUGS

Filed Oct. 30, 1962     2 Sheets-Sheet 1

INVENTOR.
LEO G. VOISINE

BY
Garvey & Garvey
ATTORNEYS

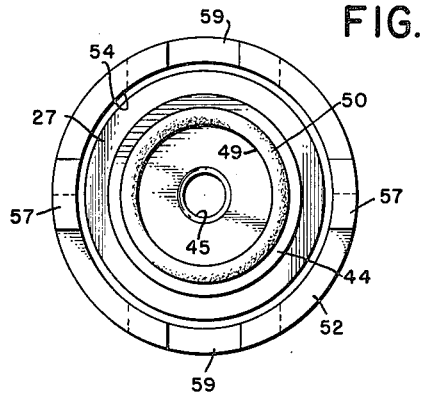
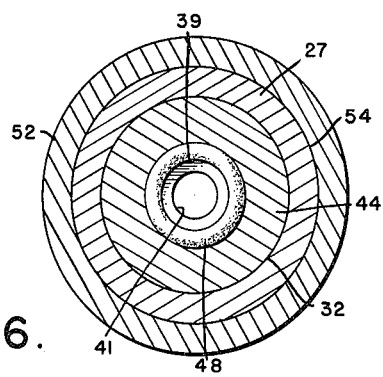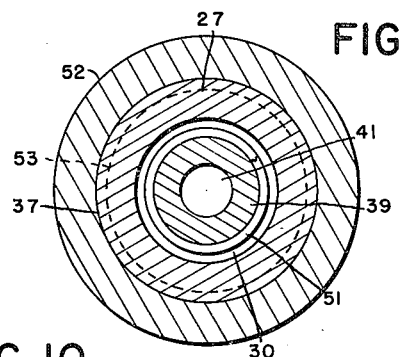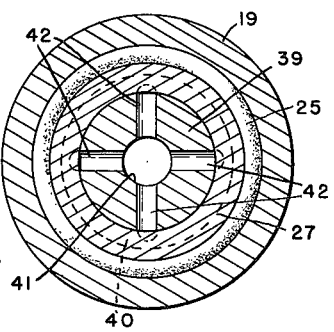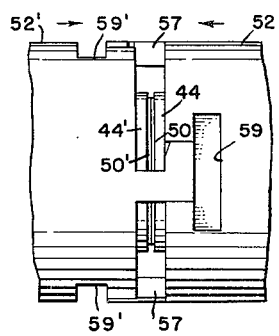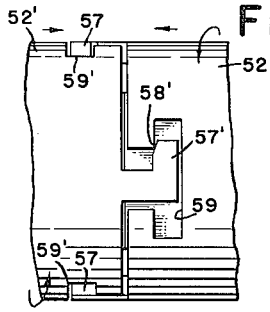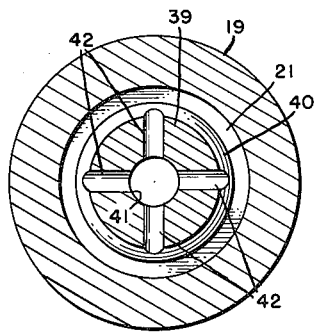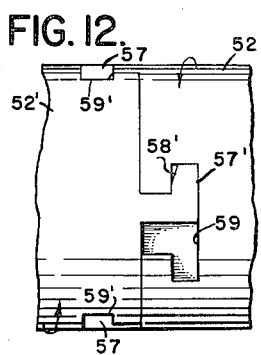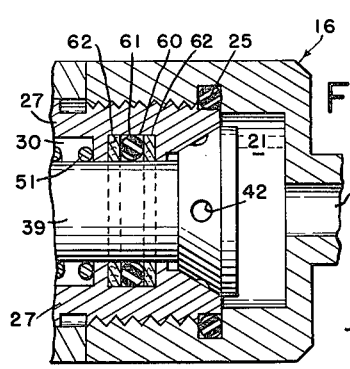

United States Patent Office 3,217,746
Patented Nov. 16, 1965

3,217,746
FLUID VALVE COUPLING WITH INTER-LOCKING LUGS
Leo G. Voisine, New Bedford, Mass., assignor to Brock Industries, Inc., Bedford, Mass.
Filed Oct. 30, 1962, Ser. No. 234,067
3 Claims. (Cl. 137—614.04)

This invention relates to a fluid valve coupling for hose or pipe ends, automatically providing free flow of fluid under pressure or vacuum, upon connection of the coupling members, each coupling member automatically sealing itself upon disconnection.

It is an object of this invention to provide a fluid coupling embodying coupling members of identical construction which may be simply and quickly interlocked, to provide an efficient and tight mechanical seal.

Other objects are to provide a coupling capable of operating within a broad range of temperatures and pressures with caustic or non-caustic materials, the coupling members holding pressure or vacuum in a coupled or uncoupled condition; to provide a coupling of the character described in which the union of the coupling members is accomplished by an interlocking lug system, engagement and disengagement being effected by hand, thereby obviating the use of tools for connection and disconnection; to provide coupling members including valves which, when coupled, are sealed under spring tension, the valves being forced open by interlocking of lug means against the tension of the springs; to provide a valve coupling in which the valve operation is a straight line motion on the longitudinal axis accomplished by normal coupling action with no rotational forces exerted on the component parts by virtue of a freely rotating interlocking lug system, and to provide a coupling constructed of a minimum number of simple parts, presenting no special or exotic machine processing, and which readily lend themselves to manufacture on standard machines, using standard mass production methods.

Other objects of the invention will be apparent from the following description of the present preferred forms of the invention, taken in connection with the accompanying drawings, wherein:

FIG. 5 is an end view of a coupling member constructed in accordance with the present invention, showing to advantage the valve sealing member and interlocking lug assembly forming a part of the present invention;

FIG. 6 is a sectional view taken along the line 6—6 of FIG. 3, looking in the direction of the arrows;

FIG. 7 is a sectional view taken along the line 7—7 of FIG. 3, looking in the direction of the arrows;

FIG. 8 is a sectional view taken along the line 8—8 of FIG. 3, looking in the direction of the arrows;

FIG. 9 is a sectional view taken along the line 9—9 of FIG. 4, looking in the direction of the arrows;

FIG. 10 is a fragmentary plan view of the coupling of the present invention showing the initial step of interlocking the lugs and lug recesses of the coupling members;

FIG. 11 is a view similar to FIG. 10 showing the second step in the locking operation;

FIG. 12 is a view similar to FIGS. 10 and 11 showing the final step in completing locking of the coupling members of the present invention; and FIG. 13 is a fragmentary longitudinal sectional view of a modified form of coupling member.

Figure 1:
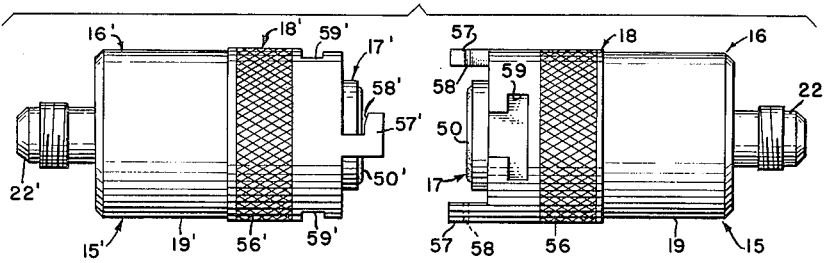
FIG. 1 is a plan view of the fluid valve coupling of the present invention, showing the coupling members in uncoupled position.
Figure 2:
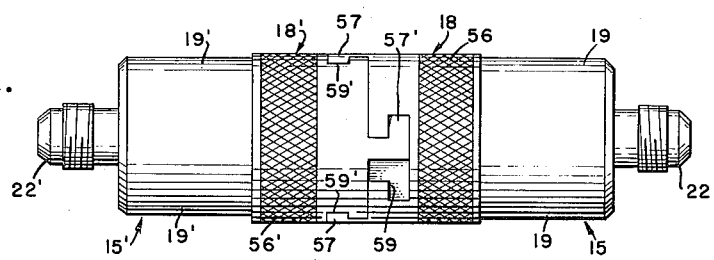
FIG. 2 is a view similar to FIG. 1, showing the coupling members in coupled position.

Referring now in greater detail to the drawings, the fluid valve coupling of the present invention comprises two coupling members designated 15 and 15', which are of identical construction. Because of the identity in construction, only coupling member 15 will be described in detail, and the corresponding parts of coupling member 15' will be identified in the drawings by like, primed numbers.

Figure 3:
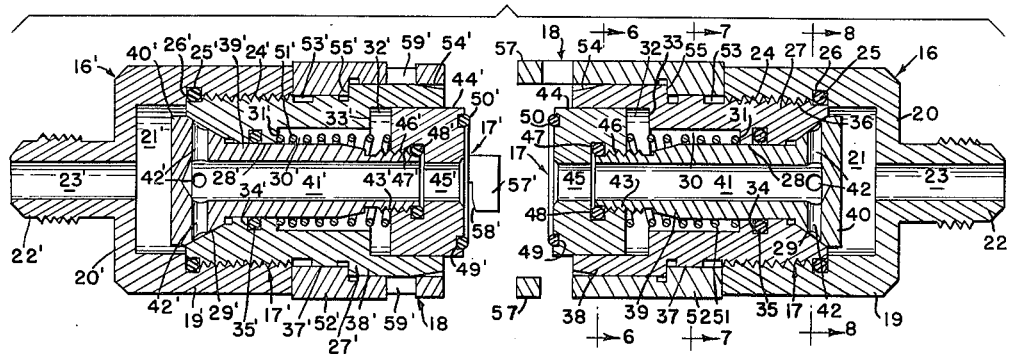
FIG. 3 is an enlarged longitudinal sectional view of the uncoupled coupling members shown in FIG. 1.

As shown to advantage in FIG. 3, coupling member 15 includes a valve housing 16, a valve assembly 17 and an interlocking lug assembly 18. Valve housing 16 includes a cylindrical body 19 extending from a point intermediate the length of the coupling member to a rear wall 20, said cylindrical body forming an axial bore 21. A threaded extension or nipple 22, beyond rear wall 20, is adapted for engagement with a hose or pipe through which fluid passes. Nipple 22 is provided with a bore 23 which is in communication with bore 21 of cylindrical body 19. The inner periphery of cylindrical body 19, remote from nipple 22, is threaded as indicated at 24. A sealing ring 25 is positioned in an annular recess 26 of cylindrical body 19, adjacent threads 24.

Valve assembly 17 includes a cylindrical valve body 27, having an axial bore 28, one end of which bore is flared to provide a valve seat 29. Intermediate its length, axial bore 28 is enlarged as indicated at 30, thereby forming an annular shoulder or abutment 31. Enlarged bore 30, in turn, issues into a still larger bore 32, adjacent the terminal of the cylindrical body, thereby forming a second annular shoulder or abutment 33. At a point intermediate axial bore 28, there is provided an annular recess 34 adapted to receive a sealing ring 35. The outer periphery of one terminal of valve body 27 is threaded at 36 for engagement with complemental threads 24 of valve housing 16. Intermediate the length of valve body 27 is provided an annulus 37 adapted for engagement with a portion of interlocking lug assembly 18. Near its inner end, the outer periphery of valve body 27 is of increased diameter, as indicated at 38.

In connection with valve body 27, there is provided a valve 39 extending longitudinally through axial bore 28 and enlarged portions 30 and 32 thereof, which valve is also movable longitudinally with respect to the valve body. One terminal of valve 39 is gradually enlarged to form a tapered head 40, the peripheral portion of which is complemental to, and adapted for engagement with, valve seat 29. Valve 39 is provided with an axial bore 41 which extends from the inner terminal of the valve to a point lying within valve head 40, at which point it is in communication with a plurality of passages 42 extending at right angles thereto, through the periphery of valve head 40. When valve 39 is in the operative position shown in FIG. 4, passages 42 are in communication with axial bore 21 of valve housing 16.

The terminal of valve 39, remote from valve head 40 is reduced and threaded as indicated at 43 for engagement with a sealing member 44 of cylindrical shape. Sealing member 44 is provided with an axial bore 45, one terminal of which is enlarged and threaded at 46 for engagement with threads 43 of valve 39. Bore 45 is in communication with bore 41 of valve 39. Sealing member 44 is also provided with an annular recess 47 adjacent threads 46, in which is positioned a sealing member 48. The outer face of sealing member 44 is additionally provided with an annular recess 49 adapted to receive a sealing ring 50 which extends beyond the limits of the front face of the sealing member.

In accordance with the present invention, there is provided a convolute spring 51 positioned around valve 39 within enlarged axial bore portion 30, one terminal of which spring is in engagement with annular shoulder 31 of valve body 27, and the other terminal of which engages the rear face of sealing member 44. As shown in FIG. 3, the spring tension exerted on sealing member 44 effects longitudinal movement of valve 39 in a direction to seat valve head 40 and locate the front face of the sealing member at a point beyond the terminal of valve body 27.

In accordance with the present invention, lug assembly 18 includes a cylindrical body portion 52 having an axial bore 53, one terminal of which cylindrical body portion abuts cylindrical body 19 of valve housing 16. The inner periphery of cylindrical body portion 52 abuts annulus 37 of valve body 27. The axial bore of body portion 52 is enlarged at 54, thereby forming an abutment 55 for engagement with an end terminal of portion 38 of valve body 27, thereby preventing relative longitudinal movement of body portion 52 with respect to valve body 27 but, at the same time, permitting relative rotational movement. Rotation is facilitated by knurling a portion of the outer periphery of body portion 52 as indicated at 56. The terminal of body portion 52, proximate enlarged bore 54 is extended on diametrically opposed sides of the body to provide lugs 57, each of which is of substantially right angle shape. One face of the transverse section of each lug is chamfered, as indicated at 58.

In connection with diametrically opposed lugs 57, the terminal of body portion 52 proximate enlarged bore 54 is provided with diametrically opposed lug-receiving recesses 59, of substantially T shape, which recesses are at ninety degree angles to lugs 57. As shown in FIG. 10, that portion of recess 59 at the terminal of body portion 52 is slightly larger in width than the width of the transverse portion of lug 57, in order to permit passage thereof to the transverse portion of the recess. The transverse portion of the recess is of a size adapted to receive the transverse portion of lug 57.

Figure 4:
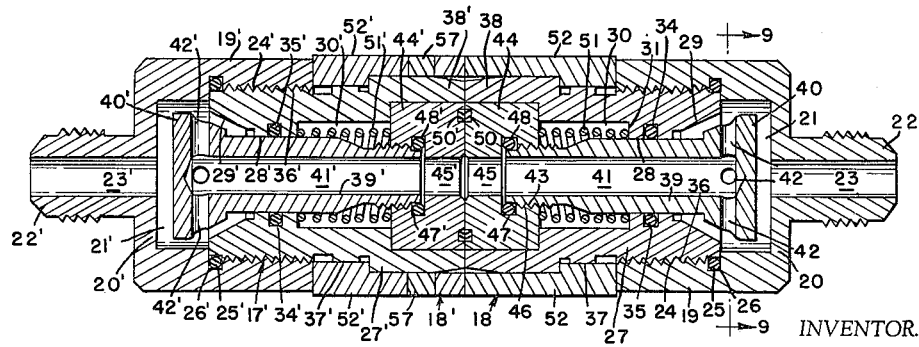
FIG. 4 is an enlarged longitudinal sectional view of the coupled coupling members shown in FIG. 2.

As shown in FIG. 3, before coupling members 15 and 15' are joined, valve heads 40 and 40' are positively positioned in valve seats 29 and 29' under urging of springs 51 and 51', thereby sealing passages 42 and 42' and preventing fluid flow through the valves. At this time also, sealing members 44 and 44' are extended beyond the terminals of valve body 27 under the tension of springs 51 and 51'. In coupling members 15 and 15', lugs 57 and 57' are introduced into lug-receiving recesses 59' and 59 respectively, as shown in FIG. 10. During this step, sealing members 44 and 44' are forced rearwardly against the tension of springs 51 and 51' until they engage annular shoulders 33 and 33', at which time the front faces of the sealing members are uniplanar with the terminals of valve bodies 27 and 27'. Upon rotation of interlocking lug assemblies 18 and 18', as shown in FIG. 11, the chamfered surfaces 58 and 58' of lugs 57 and 57' produce a camming effect, to urge the opposed faces of members 15 and 15' into contiguous relationship and continued rotation places lugs 57 and 57' in the completely locked position shown in FIG. 12. As shown in FIG. 4, when coupling members 15 and 15' are connected, rings 50 and 50' are flattened out within the confines of annular recesses 49 and 49' and the opposed rings are in sealing engagement with each other to positively preclude any leakage of fluid therebetween. At this time, the valves are in the position shown in FIG. 4, thereby permitting free flow of fluid through the coupling. Accidental disengagement of the coupling members is positively prevented by the present construction, because of the necessity of moving the interlocking lug assemblies of the coupling members longitudinally with respect to each other, followed by rotational movement with respect to one another. Additionally, the tension of springs 51 and 51' acting in opposite directions on the coupling members, further precludes accidental relative movement and consequent uncoupling of members 15 and 15'.

Coupling members 15 and 15' are disconnected by following the reverse procedure set out above in connection with the coupling thereof. This is accomplished by first rotating lug assemblies 18 and 18' with respect to each other, to a position where lugs 57 and 57' can be withdrawn from lug recesses 59' and 59 respectively. Springs 51 and 51' aid the uncoupling after the rotational step has been completed. After the lugs and lug-receiving recesses are disengaged, springs 51 and 51' effect longitudinal movement of valves 39 and 39' to automatically and positively seal the latter, by seating valve heads 40 and 40' on valve seats 29 and 29'.

In FIG. 13 there is shown a modified form of coupling member which is particularly adapted for use at high pressures. This modified structure is substantially the same as that shown in FIGS. 1 through 12 and like parts are therefore identified by the same numbers as in the preferred form. In connection with the modified form however, valve body 27 is provided with an enlarged annular recess 60 in which is centrally positioned, a sealing ring 61. Back-up rings 62 are located on each side of sealing ring 61 to reinforce the latter for withstanding high pressures.

It is to be noted that the interlocking lug assembly of the present invention is independently rotatable with respect to the main portion of the coupling member so that coupling may be effected without rotational movement of the coupling member. Since the valve operation is a straight line motion on the longitudinal axis, and by virtue of the independent rotation of the lug assembly, no rotational forces are exerted on opposed faces or sealing rings of the coupling members. The structural arrangement of the present coupling parts enable the coupling to withstand pressure in both a coupled or uncoupled state.

The identity of the coupling members comprising the present coupling results in economy of manufacture with a minimum number of different parts. Additionally, these parts are of simple construction, which may be readily manufactured of a variety of materials, on standard machines, by standard methods.

Various changes may be made within the scope of the claims hereto appended.

What is claimed is:

1. A fluid coupling comprising identical coupling members adapted for interconnection, each of said coupling members including a valve housing having an axial bore, a valve assembly positioned in said valve housing and including a valve body, a portion of said valve body being flared to provide a valve seat, an internal shoulder in the valve body bore intermediate its length, the assembly further including a multi-part valve positioned in said valve body, and movable longitudinally with respect thereto, one end of said valve being gradually enlarged to form a tapered head, the peripheral portion of which is complemental to, and adapted for engagement with, said valve seat, a sealing member connected to the opposite end of said valve, said sealing member extending beyond the limit of said valve body and being provided with an annular recess in the front face thereof, intermediate the inner and outer periphery thereof, a sealing ring positioned in the annular recess and protruding beyond the front face of said sealing member, a spring positioned on said valve body between said sealing member and said internal shoulder in the valve body for normally holding said valve head in fluid-tight engagement with said valve seat and for forcing said sealing member beyond the valve body, a fluid passage extending axially through said sealing member and said valve to said valve head, fluid conduits extending from said fluid passage through the periphery of said valve head, the coupling of said members compressing said sealing elements in their annular recesses and effecting movement of the respective valve heads out of sealing engagement with their valve seats against the resistance of the spring of each coupling member, to open communication between said coupling members, and a lug assembly mounted on said valve body of each member for complemental engagement with the lug assembly of the opposed member, to effect locking when said lug assemblies are relatively rotated, each lug assembly including a cylindrical body rotatable with respect to said valve and valve housing, and lugs of right angle shape extending from a terminal of said cylindrical body, in diametrically opposed relationship, said terminal being provided with complemental lug-receiving recesses adapted to receive the lugs of the opposed coupling member.

2. The fluid valve coupling of claim 1, wherein the terminal of a transverse surface of each right angle lug is chamfered, said chamfered surface engaging the portion of the opposed coupling member defining a lug-receiving recess to produce a camming effect resulting in a tight connection when the lug assemblies of the coupling members are joined and rotated with respect to each other.

3. A fluid coupling comprising identical coupling members adapted for interconnection, each of said coupling members including a valve housing having an axial bore, a longitudinally movable valve assembly positioned in said valve housing and including a valve body, a portion of said valve body being formed to provide a valve seat, the assembly further including a valve positioned in said valve body, said valve having a fluid passage extending therethrough, one end of said valve having a head in sealing engagement with said valve seat, a sealing member connected to the opposite end of said valve, said sealing member extending beyond the limit of said valve body and being provided with an annular recess in the front face thereof, intermediate the inner and outer periphery of the sealing member, a sealing element positioned in the annular recess and protruding beyond the front face of said sealing member, means interposed between said sealing member and a portion of said valve body, for normally maintaining said valve in sealing engagement with said valve seat and extending said sealing member beyond the limit of said valve body, and a locking assembly rotatably mounted on said valve body, said locking assembly including a cylindrical body, portions of one terminal thereof being extended beyond the valve body to form opposed lugs of substantially right angle shape, opposed side terminals of said cylindrical body being cut out to provide complemental lug-receiving recesses, said coupling members being connected by engaging the lugs of one coupling member with the lug-receiving recess of the other coupling member, thereby forcing the projecting sealing members and the valves aft of the respective coupling members against the tension of said means, to unseat the valve head to permit flow of fluid through said coupling members, the terminal of a transverse surface of each right angle lug being chamfered, said chamfered surface engaging the portion of the opposed coupling member defining a lug-receiving recess, to produce a camming effect resulting in a tight connection when the lug assemblies of the coupling members are joined and rotated with respect to each other.

References Cited by the Examiner
UNITED STATES PATENTS

| | | | |
|---|---|---|---|
| 763,236 | 6/1904 | Winkler | 285—361 X |
| 770,570 | 9/1904 | Geddes | 137—614.05 |
| 833,702 | 10/1906 | Tomlinson | 213—76 |
| 882,017 | 3/1908 | Pulliam | 137—614.04 X |
| 1,611,286 | 12/1926 | Shaff | 285—70 |
| 2,245,847 | 6/1941 | Bagey | 285—361 X |
| 2,257,321 | 9/1941 | Arnold | 285—33 X |
| 2,819,914 | 1/1958 | Eitner | 137—614.04 X |

FOREIGN PATENTS

| | | |
|---|---|---|
| 484,553 | 5/1938 | Great Britain. |
| 537,086 | 6/1941 | Great Britain. |
| 558,438 | 1/1944 | Great Britain. |

References Cited by the Applicant
UNITED STATES PATENTS

| | | |
|---|---|---|
| 2,399,525 | 4/1946 | Waag. |
| 2,687,314 | 8/1954 | Kaiser. |

ISADOR WEIL, *Primary Examiner.*

WILLIAM F. O'DEA, *Examiner.*

UNITED STATES PATENT OFFICE
CERTIFICATE OF CORRECTION

Patent No. 3,217,746                 November 16, 1965

Leo G. Voisine

It is certified that error appears in the above identified patent and that said Letters Patent are hereby corrected as shown below:

Column 5, line 25, cancel "longitudinally movable"; line 29, after "body," insert -- and movable longitudinally with respect thereto, --.

Signed and sealed this 4th day of November 1969.

SEAL)

Attest:

Edward M. Fletcher, Jr.                 WILLIAM E. SCHUYLER, JR.

Attesting Officer                          Commissioner of Patents